United States Patent [19]

Rau et al.

[11] Patent Number: 4,509,438
[45] Date of Patent: Apr. 9, 1985

[54] COMBINATION IMPLEMENT FOR AGRICULTURAL CULTIVATION

[75] Inventors: Willy Rau, Weilheim; Christian Taus, Kirchheim, both of Fed. Rep. of Germany

[73] Assignee: Maschinenwerk Rau GmbH, Weilheim, Fed. Rep. of Germany

[21] Appl. No.: 528,463

[22] Filed: Aug. 31, 1983

[30] Foreign Application Priority Data

Aug. 31, 1982 [EP] European Pat. Off. ......... 82107986.0

[51] Int. Cl.³ .................. A01C 7/08; A01B 49/06
[52] U.S. Cl. .......................................... 111/13; 172/68; 172/71; 172/117; 172/501; 403/109; 403/112
[58] Field of Search .................. 172/68, 253, 501, 47, 172/71, 117, 123, 633, 657, 677; 111/63, 13; 403/109, 116, 112

[56] References Cited

U.S. PATENT DOCUMENTS 3,019,747  2/1962  Strahan .............................. 111/63
3,021,908  2/1962  Dlugosch ....................... 172/501 X
4,018,170  4/1977  van der Lely et al. .......... 172/68 X
4,053,019  10/1977  van der Lely .................. 172/253 X

FOREIGN PATENT DOCUMENTS 3017746  11/1981  Fed. Rep. of Germany ........ 172/68
2007483  5/1979  United Kingdom .................. 172/68

Primary Examiner—Richard T. Stouffer
Attorney, Agent, or Firm—Michael J. Striker

[57] ABSTRACT

A combination implement for agricultural cultivation has a main frame liftably connectable with a pulling or dragging machine and supporting a cultivating device, and an auxiliary frame carrying a crumbler roller which supports the combination implement during cultivation and is adjustable relative to the main frame, wherein a supporting member is provided between the main frame and the auxiliary frame and has a play so that the main frame with the cultivating device arranged thereon can be upwardly deflected relative to the auxiliary frame or the crumbler roller during the cultivation.

11 Claims, 3 Drawing Figures

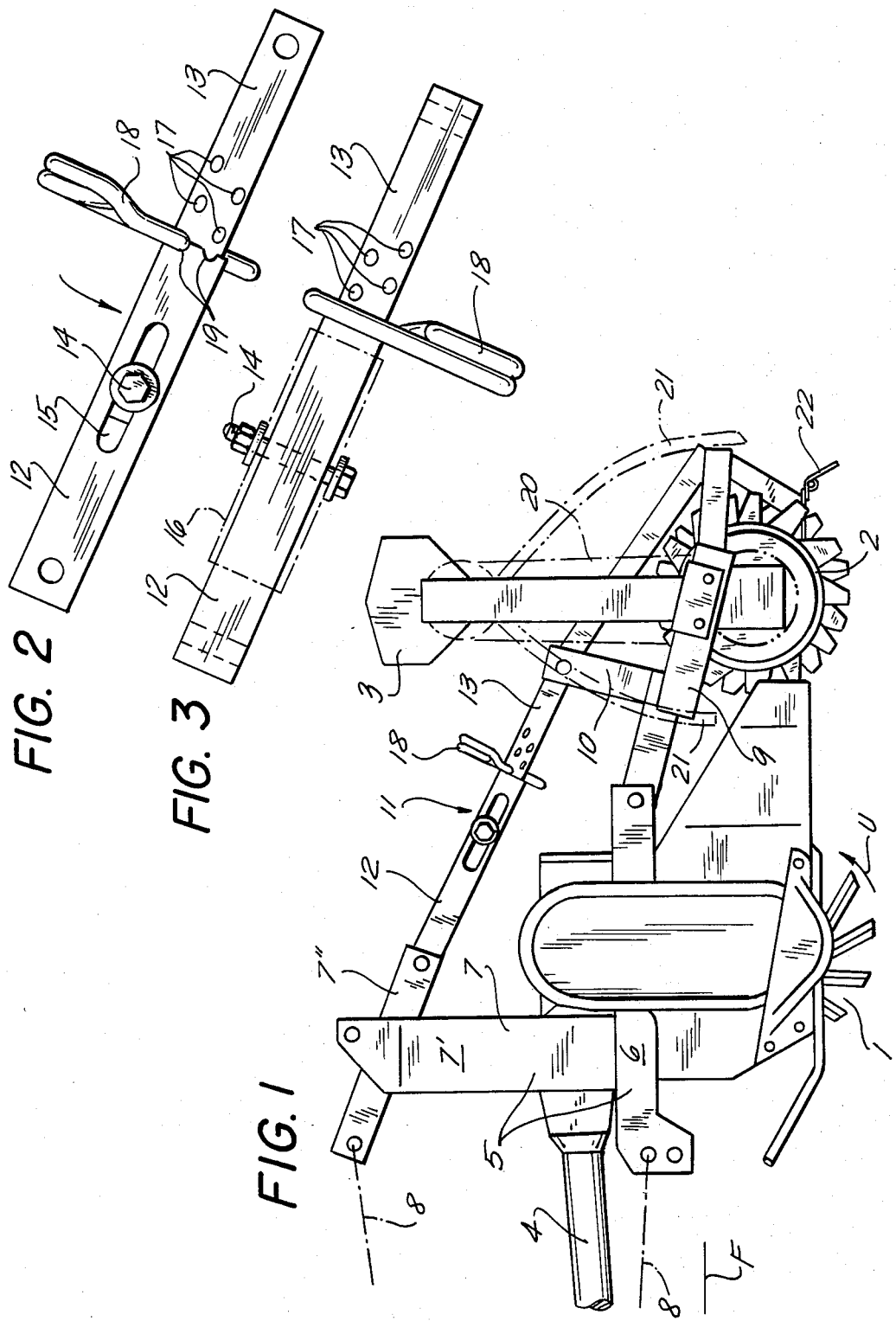

COMBINATION IMPLEMENT FOR AGRICULTURAL CULTIVATION

BACKGROUND OF THE INVENTION

The present invention relates to a combination implement for agricultural cultivation.

Combination implements of the above mentioned general type are known in the art. A known combination implement has a main frame which is liftably connected (for example with the aid of a three-point linkage) with a pulling or dragging vehicle and carries advantageously exchangeable cultivating device, for example a cultivating or cutting tool and/or power take-off shaft-driven device such as a time rotor or a circular harrow. It also has an auxiliary frame which carries a crumbler roller supporting the combination implement during cultivation and formed as an extension of the main frame, and also supported on the main frame, adjustable for height adjustment, about a transverse axis. Because of the arrangement of tools of different type, a single travel for cultivating the respective ground surface is sufficient. During cultivation the combination implement remains vertically movable relative to the pulling or dragging vehicle and is exclusively or mainly supported by the crumbler roller. Such an arrangement is advantageous since the crumbler roller rolls on the ground to be cultivated, which has only a small waviness. Thereby the entire combination implement performs relative to the ground only relatively small vertical movements, so that the working output is considerably improved. Moreover, the crumbler roller is axially loaded, so that the soil to be cultivated can be compacted by the crumbling roller in desirable manner. This is true also when the crumbler roller is of a type having a relatively small weight and correspondingly low manufacturing costs.

The height-adjustability of the auxiliary frame relative to the main frame makes possible the height adjustment of the tool arranged on the main frame in a simple manner relative to the crumbler roller. Moreover, the auxiliary frame can be formed as a conventional frame which is provided in general for cultivating implements and has a crumbler roller. The cultivating tools arranged on the main frame penetrate as a rule relatively deep into the soil, and therefore can in certain conditions strike against stones or similar compact formations under the ground surface. In this case the tool tends to deflect upwardly, whereas the rigid arrangement of the entire combination implement is lifted. This is connected, however, with an extraordinarily high loading of the respective tool, which in this condition can be broken.

It is basically known to arrange cultivating tools individually or as a whole in a springy manner. However, the respective construction is complicated and accordingly expensive. Moreover, the elastically springy arrangement of the cultivating tools undesirably affects its working output.

SUMMARY OF THE INVENTION

Accordingly, it is an object of the present invention to provide a combination implement which avoids the disadvantages of the prior art.

More particularly, it is an object of the present invention to provide a combination implement for agricultural cultivation which, on the one hand, displays a good working output and inexpensive construction and, on the other hand, reduces the danger of damage to cultivating tools in that the cultivating tools can deflect upwardly.

In keeping with these objects and with others which will become apparent hereinafter, one feature of the present invention resides, briefly stated, in a combination implement for agricultural cultivation in which a supporting member between a main frame and an auxiliary frame has a play formed so that the main frame with the cultivating device arranged thereon can deflect upwardly relative to the auxiliary frame or the crumbler roller during cultivation.

When the combination implement is designed in accordance with the present invention, the height of all cultivating tools on sufficiently yieldable (normal) soils can be provided by adjustment of the support between the main frame and the auxiliary frame. A springy yielding and connected therewith vibrations of the cultivating tools are excluded in this case. When however one or several cultivating tools arranged on the main frame strike against a stone or the like, the main frame with the tools mounted thereon is lifted, or in other words the tools arranged on the main frame must lift the weight of the main frame and the devices directly arranged thereon, not however also the auxiliary frame with the crumbler roller. Thereby the loaing of the cultivating tools during running on stony ground and the like is considerably reduced.

Moreover, the crumbler roller remains not lifted in these cases and therefore fully operable.

In accordance with an advantageous embodiment of the invention, the combination implement is provided with auxiliary devices, such as an arrangement for application of seeds and/or fertilizers located on the auxiliary frame. If necessary, this arrangement can be connected in a driven manner with the crumbler roller. This construction is based on the principle that the weight of the auxiliary devices is directly supported on the auxiliary frame and therefore on the crumbler roller, so that the main frame does not have any additional loading and therefore can deflect outwardly relative to the crumbler roller against a relatively low resistance.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

BRIEF DESCRIPTION OF THE DRAWINGS

FIG. 1 is a side view showing a combination implement in accordance with the present invention;

FIG. 2 is a telescopable element provided for support between the main frame and the auxiliary frame of the inventive combination implement, on an enlarged scale; and FIG. 3 is a plan view of the telescopable element as seen in direction of the arrow III in FIG. 2.

DESCRIPTION OF A PREFERRED EMBODIMENT

A combination implement in accordance with the present invention as shown in FIG. 1 has substantially a tine rotor 1 which extends in a transverse direction in correspondence with the working width of the implement and rotates in a direction of rotation U assisting the travelling direction F, a crumbler roller 2 which has a working width substantially equal to the working width of the tine rotor 1, and a device 3 for discharging seeds and/or fertilizers.

The tine rotor 1 is driven by a power take-off shaft 4 and is arranged on a main frame 5 which is composed substantially of two short longitudinal struts 6 and a support 7. The support 7 is formed of two inclined members 7' which are vertical in a side view and connected at their lower end with the respective one of the longitudinal struts 6. At the upper ends, as considered in the travel direction, the inclined members 7' are connected in a V-like manner with one another with interposition of a strut part 7".

The main frame 5 is connected with a three-point linkage 8 in a known manner with a not shown tractor. Both lower links of the three-point linkage are articulately connected at the front ends of the longitudinal struts 6, whereas the upper link of the three-point linkage 8 is articulately connected between the strut parts 7" at their front ends.

An auxiliary frame 9 which carries the crumbler roller 2 is articulately connected at the rear end of the longitudinal strut 6. The auxiliary frame 9 has the arrangement 3 for discharging seeds and/or fertilizers. A support part 10 is arranged on the auxiliary frame 9 and serves for supporting the auxiliary frame 9 relative to the main frame 5. For this purpose a telescopable supporting member 11 is arranged between the upper portion of the support part 10 and the rear end of the strut path 7".

The telescopable supporting member 11 is composed substantially of a tubular part 12 and a shifting part 13, for example a massive rod part. The shifting part 13 has a smaller diameter than the tubular part 12 and is insertable into the latter.

The shifting part 13 is provided with a plurality of openings, and pins 14 are arranged in the openings so that their ends are guided in longitudinal slots 15 of the tubular part 20. Pins 14 in cooperation with the slot 15 limit the movability of the parts 12 and 13 relative to one another. The pins 14 can in some cases serve for holding a sleeve displaceably arranged on the tubular part 12 and covering the longitudinal sleeve 15 in all positions of the parts 12 and 13. The sleeve 16 has protective functions so as to prevent a person from unintentionally inserting his fingers into the slot 15 and injuring them during movement of the parts 12 and 13.

A plurality of rows of perforations 17 are provided on the shifting part 13, and an end of a spring clip 18 can be inserted in the perforations in a pin-like manner, while extending through the tubular part 20. The other end of the spring clip 18 arrestingly surrounds the shifting part 13 and secures the position of the spring clip 18.

The rows of perforations 17 are arranged so that the parts 12 and 13 are displaceable over the entire length of the longitudinal slot 15 relative to one another, when the spring clip 18 is inserted in at least right perforations as seen in FIGS. 1–3. On the other hand, the movability of the parts 12 and 13 relative to one another can be completely blocked when the shifting part 13 is maximum withdrawn from the tubular part 12 (whereas the pin 14 abuts against the right end of the longitudinal slot 15) and the spring clip 18 is inserted directly near the right end of the tubular part 12 in the perforations of the rows 17 arranged there.

In all remaining intermediate positions, the parts 12 and 13 have more or less great movability relative to one another. Moreover, in each intermediate position the spring clip 18 during the cultivation provides a different height adjustment of the main frame relative to the auxiliary frame 9 or the crumbler roller 2. During the cultivation, the main frame 5 can vertically move relative to the pulling or dragging vehicle, so that the weight of the main frame 5, as well as the device arranged thereon, namely the tine rotor 1, is transferred via the supporting member 11 to the auxiliary frame 9 for the crumbler roller 2, when the right end of the tubular part 12 abuts against the spring clip 18.

When, however, the tine rotor 1 or the device arranged on the main frame 5 runs over stones or the like, the main frame 5 can deflect upwardly because of the movability of the parts 12 and 13 relative to one another, so that the tool arranged on the main frame 5 is protected. The auxiliary frame 9 is at this time not lifted, or in other words the crumbling roller 2 remains operable. Moreover, the device arranged on the auxiliary frame 9 cannot load the device arranged on the main frame 5.

For transportation, the entire implement can be lifted with the aid of the three-point linkage 8 relative to the pulling or dragging vehicle, so that no contact with the ground takes place. The shifting part 13 is maximally withdrawn from the tubular part 12, or in other words the pin 14 abuts against the right end of the longitudinal slot 15. For preventing vibrations of the auxiliary frame 9 relative to the main frame 5, the spring clip 18 for the further transportation is displaced as far as possible to the left and inserted prior to the right end of the tubular part 12 in one perforation of the perforation rows 17, so that the movability of the parts 12 and 13 relative to one another is eliminated.

When again it is necessary to provide cultivation, the spring clip is inserted with the lifted implement in a desirable intermediate position, so that during lowering of the implement and subsequent cultivation the height of the main frame 5 relative to the auxiliary frame 9 associated with the intermediate position of the spring clip 18 is adjusted.

The inventive implement provides for a possibility to change the depth adjustment of the tools or devices arranged on the main frame 5 in extraordinarily fast and easy manner. This possibility is provided by the inventive telescopcable supporting member 11. For changing the depth adjustment it suffices for the driver of the pulling or dragging vehicle to somewhat lift the implement with the aid of the motor-driven three-point linkage 8 and then to insert the spring clamp 18 in a desired perforation of the perforation rows 17. When the implement for cultivation is again lowered whereas the three-point linkage of the implement is held with vertical movability relative to the pulling or dragging vehicle, the new depth position of the tools or devices arranged on the main frame 5 selected by insertion of the spring clip 18 is adjusted automatically. This is because the main frame 5 is supported with the aid of the telscopically supporting member 11 on the auxiliary frame 9 and therefore on the crumbler roller 2, whereas the telescopable parts 12 and 13 move into one another until the tubular part 12 abuts against the spring clip 18.

For preventing shearing off of the pin-like end of the spring clamp 18, a semicircular recess 19 is arranged at the right end of the tubular part 12. It arcuately surrounds the pin-like end of the spring clip 18 and abuts respectively with a relatively great surface on the spring clip 18.

A chain 20 can be arranged for providing a driving connection between the discharging arrangement for seeds and/or fertilizers and the crumbler roller 2.

Discharge pipes 21 guide the seeds or the fertilizers to the ground surface and are arranged as a rule before the crumbler roller 2, so that the discharged seeds or the fertilizers are at least partially covered with soil which is thrown by the tine rotor 1.

In some cases it is possible to arrange the discharge pipes 21 behind the crumbler roller 2. In this case, especially when seeds must be discharged, elastically springy combing elements 22 arranged behind the crumbler roller 2 are advantageous. Their springy ends loosen soil remaining behind on the surface and thereby cover the sees with a thin soil layer.

It will be understood that each of the elements described above, or two or more together, may also find a useful application in other types of constructions differing from the types described above.

While the invention has been illustrated and described as embodied in a combination implement for agricultural cultivation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A combination implement for agricultural cultivation, comprising
    a main frame liftably connectable with a pulling or dragging vehicle and carrying a cultivating device;
    an auxiliary frame carrying a crumbler roller which supports the implement during cultivation, said auxiliary frame being hinged to the main frame to form an extension of the latter which is pivotable about a transverse axis;
    a telescopic supporting member linked at the ends thereof between said main- and auxiliary frames and including adjustable stop means for limiting pivotal movement of the auxiliary frame in upward direction, the telescopic supporting member having a tubular part linked to the main frame and a shifting part slidably movable in the tubular part;
    the adjustable stop means including perforations provided in the shifting part and an abutment member engageable in any selected one of said perforations to adjustably limit the displacement of the shifting member into the tubular member.

2. A combination implement as defined in claim 1, wherein said main frame supports said device so that it is arranged exchangeable on the main frame.

3. A combination implement as defined in claim 1, wherein said device arranged on said main frame is a cultivating tool.

4. A combination implement as defined in claim 1, wherein said device arranged on said main frame is a blade tool.

5. A combination implement as defined in claim 1, wherein said device arranged on said main frame is a device which is driven by a power take-off shaft.

6. A combination implement as defined in claim 5, wherein said device driven by said power take-off shaft is a tine rotor.

7. A combination implement as defined in claim 5, wherein said device which is driven by said power take-off shaft is a circular harrow.

8. A combination implement as defined in claim 1, and further comprising an arrangement for applying seeds and/or fertilizers arranged on said auxiliary frame and coupled in a driven manner with said crumbler roller.

9. A combination implement as defined in claim 1, said adjustable stop means further including a longitudinal slot formed in the tubular part and a pin formed on the shifting part, the pin being guided in the slot to delimit the maximum displacement of the shifting part relative to the tubular part.

10. A combination implement as defined in claim 9 wherein the perforations in the shifting member are arranged in a row extending in the direction of movement of the shifting member, an extreme perforation in the row and the free end of the tubular member coinciding with a limit position of the pin in the slot so that the movement of the telescopic supporting member is arrested by inserting the abutment member into the extreme perforation.

11. A combination implement as defined in claim 1 wherein said abutment member is a detachable spring clip having a pin-like portion insertable into one of said perforations of the shifting part.

* * * * *